(12) United States Patent
Matsui et al.

(10) Patent No.: US 6,960,334 B1
(45) Date of Patent: Nov. 1, 2005

(54) AMORPHOUS NANO-SCALE CARBON TUBE AND PRODUCTION METHOD THEREFOR

(75) Inventors: Hisaji Matsui, Nara (JP); Ryoichi Nishida, Ikoma (JP); Hitoshi Nishino, Kyoto (JP); Chiharu Yamaguchi, Akashi (JP); Haruyuki Nakaoka, Kishiwada (JP); Kazuhiro Takezaki, Yamatokoriyama (JP); Katsuhiro Sasaki, Osaka (JP)

(73) Assignee: Osaka Gas Company Limited, Osaka (JP)

( * ) Notice: Subject to any disclaimer, the term of this patent is extended or adjusted under 35 U.S.C. 154(b) by 0 days.

(21) Appl. No.: 09/868,620

(22) PCT Filed: Oct. 29, 1999

(86) PCT No.: PCT/JP99/06061

§ 371 (c)(1),
(2), (4) Date: Jun. 25, 2001

(87) PCT Pub. No.: WO00/40509

PCT Pub. Date: Jul. 13, 2000

(30) Foreign Application Priority Data

| Dec. 28, 1998 | (JP) | .......................................... | 10/372258 |
| Jun. 7, 1999 | (JP) | .......................................... | 11/159178 |

(51) Int. Cl.$^7$ ................................................. D01F 9/12
(52) U.S. Cl. ............................... 423/447.1; 423/447.2; 423/447.3; 423/445 R; 977/DIG. 1
(58) Field of Search .......................... 423/447.1, 447.3, 423/445 R; 977/DIG. 1

(56) References Cited

FOREIGN PATENT DOCUMENTS

| JP | 62-500943 | | 4/1987 |
| JP | 10-72201 | | 3/1998 |
| JP | 410072201 A | * | 3/1998 |
| WO | WO 86/03455 | | 6/1986 |
| WO | WO 99/43613 | | 9/1999 |
| WO | WO 99/56870 | | 11/1999 |

OTHER PUBLICATIONS

Kyotani et al., Chem. Mater., 1996, vol. 8, No. 8, pp. 2109–2113, pub. 1996.
Wenlou Wang et al., Electrochemical Society Proceedings, 1977, vol. 97, No. 14, pp. 814–824, pub. 1997.
N.I. Maksimova et al., Carbon, 1999, vol. 37, No. 10, pp. 1657–1661, received by JICST on Sep. 30, 1999.
Kawase et al., Carbon, 1999, vol. 37, No. 3, pp. 522–524, published in Feb. 1999.
E.F. Kukovitskii et al., Chemical Physics Letters, 1997, vol. 266, pp. 323–328, pub. 1997.
A.C. Dillon et al., Nature 1997, vol. 386, pp. 377–379, pub. Mar. 1997.
Wenlou Wang et al.; Electrochemical Society Proceedings, vol. 97, No. 14; "Amorphous–carbon nanotube: The growth intermediates of graphic carbon nanotube?"/p. 814–824; 1997.
E. F. Kukovitskii et al.; Chemical Physics Letters, vol. 266; "Carbon Nonotubes of polyethylene"; p. 323–328; 1997.
Noboru Kawase et al.; Carbon; vol. 36; No. 12; "In–situ observation of formation of nanoscale carbon tubules"; p. 1864–1865; 1998.
A. Yasuda et al.; International Symposium of Carbon; No. 25; "Polyyne–containing carbon: Electrochemical Preparation and Its Reaction"; p. 146–147; 1998.
E. F. Kukovitskii et al.; Mol. Mat.; vol. 8; Synthesis and study of new carbon films containing nanotube/fullerene structures; p. 17–20; 1996.
A. C. Dillion et al.; "Storage of Hydrogen in Single–Walled Carbon Nonotubes"; Nature; vol. 386 (1997); pp. 377–379.
"Preparation of Carbon Nanotubes", New Carbon Material, Ci, vol. 13, No. 2, Jun., 1998 (no translation).
Chinese Office Action with partial English translation, dated Nov. 21, 2003.
Toshikatsu Ishikawa et al., "Shin Tanso Kogyo", pbu. By Kindai Henshuusha on Jul. 1, 1986, Revised Edition, pp. 64–65. (no translation).
Morinobu Endo et al., "Formation of carbon nanotubes and nanofibers by gas phase pyrolysis and their indutrial applications", Part 1, Carbon Nanotube etc. Nanoticlnlogy held by New Energy Develpment Organization on Apr. 25, 2001.

\* cited by examiner

Primary Examiner—Stanley S. Silverman
Assistant Examiner—Peter J Lish
(74) Attorney, Agent, or Firm—Armstrong, Kratz, Quintos, Hanson & Brooks, LLP (57) ABSTRACT

Straight, nano-scale-order amorphous carbon tubes having a long-term stable ability for storing various kinds of gases and being stable in shape, and a novel process for producing said carbon tubes with high purity, high yield and high mass-productivity are provided.

The amorphous nano-scale carbon tubes are prepared by subjecting a heat-decomposable resin having a decomposition temperature of 200 to 900° C. to an excitation treatment in the presence of a metal powder and/or a metal salt, or by subjecting a carbon material containing —C≡C— and/or =C= to a heat-treatment at 3000° C. or lower.

20 Claims, 8 Drawing Sheets

AMORPHOUS NANO-SCALE CARBON TUBE AND PRODUCTION METHOD THEREFOR

TECHNICAL FIELD

The present invention relates to amorphous nano-scale carbon tubes each of which comprises carbon as a main framework and has a diameter of 0.1 to 1000 nm and a hollow fiber shape; a carbon material containing the amorphous nano-scale carbon tubes; and a method for producing the amorphous nano-scale carbon tubes or the carbon material.

BACKGROUND ART

Conventionally, carbon fibers are produced by forming a starting material such as pitch or polyacrylonitrile into fibers while maintaining the main chain framework of the starting material. This type of method is incapable of producing a product wherein the nano-scale molecules are controlled.

Carbon nanotubes (hereinafter referred to as "CNTs"), which have been attracting attention recently, can be roughly regarded as fibers controlled at the molecular level. CNTs are produced by the carbon arc method, sputtering, laser beam irradiation or like technique, using graphite or like starting carbon material in the presence of a metal catalyst. However, these techniques chiefly produce carbon nanotubes having a graphitic structure. One example of a carbon nanotube of such a structure is a carbon filament comprising a graphitic core surrounded by irregular pyrrolytic carbon (Oberlin, Endo, Koyama; Carbon 14, 133 (1976)).

Also, Japanese Examined Patent Publications No. 1991-64606 and No. 1991-77288 and other publications disclose carbon fibrils each comprising a graphitic outer portion and an inner core comprising irregular carbon atoms. In the disclosed techniques, however, it is practically difficult to control straightness of molecules or shape factors such as diameter and length.

Further, attempts have been made to produce CNTs using acetylene or like gaseous hydrocarbon as a starting material in the presence of a catalyst such as iron. However, also in these techniques, it is practically difficult to control straightness of molecules, diameter, length and the like while maintaining the graphitic structure. Stated specifically, in all of these techniques, the starting materials are excited into a gas-phase activated carbon state and then allowed to form CNTs during the process of recombination. Therefore, it is extremely difficult to control the reaction parameters such as the amount of the starting material, resulting in production of CNTs having a graphitic structure and varying widely in shape. The products obtained by these techniques have a degree of graphitization (crystallinity) of at least 5%, and 50% to 100% in most cases. Further, the end each of the CNTs is closed with a cap and CNTs often contain a metal at the tips.

One report points out the existence of carbon nanotubes having an amorphous structure, as a precursor of graphitic carbon nanotubes. However, the existence of the carbon nanotubes with an amorphous structure is merely presumed from the existence of carbon tubes with an amorphous structure which are observed, through TEM, among the graphitic carbon nanotubes. Moreover, the amorphous carbon tubes are reported to be an intermediate product temporarily formed in the process of forming the graphitic carbon tubes. Thus, the selective synthesis method or use of the amorphous carbon nanotubes have not been elucidated yet (Wenlow Wang et al: Electrochemical Society Proceedings Volume 97-14, 814(1997)).

As discussed above, it is practically difficult for the conventional techniques to control the crystal structure, molecular straightness, diameter, length, end structure and the like of the CNTs. In particular, the CNTs have a substantially graphitic structure, and thus have low degree of freedom of structural control. Moreover, the conventional techniques have the problem that amorphous carbon formed as a by-product contaminates the graphite product and makes purification extremely difficult.

Regarding the properties of CNTs, it has been reported that CNTs are likely to adsorb a hydrogen gas densely by their capillary action (A. C. Dillon et al: Nature, 386, 377(1997)). Further, U.S. Pat. No. 5,653,951 states that solid layered nanostructures (graphite nanofibers) are capable of chemisorbing a large amount of hydrogen into the interstices of the graphite layers.

However, reports on these known materials merely point out possible performance characteristics of the materials on a research and development level. This is because the prior art techniques have a number of problems such as difficulties in material synthesis process and in control of structure and shape that affect the material stability, lack of mass-productivity, and the like. Moreover, the graphite nanofibers do not have sufficient durability for repetitive use, since the distance between the graphite layers expands as the fibers adsorb hydrogen. Accordingly, there remain a number of problems to be solved before putting the known materials into practical use.

OBJECTS OF THE INVENTION

The main object of the present invention is to provide amorphous nano-scale carbon tubes in hollow fiber shape, which are excellent in mechanical, electronic and chemical properties and comprise carbon having a structure and shape controlled at a nano-scale level; and a novel method that enables industrial production of such amorphous nano-scale carbon tubes in high purity, high yield and high mass-productivity.

A further object of the present invention is to provide a gas-storing material comprising an amorphous nano-scale carbon tube, which has a stable high capacity for storing a variety of gases and possesses excellent durability; and a method for storing a gas utilizing the gas storing material.

DISCLOSURE OF THE INVENTION

The present inventors conducted extensive research in view of the above status of the prior art, and obtained the following findings:

(1) The wall each of the amorphous nano-scale carbon tubes has amorphous structure consisting of hexagonal carbon layers oriented in all directions. The spacing between the hexagonal carbon layers imparts flexibility to the carbon tubes, and enables the carbon tubes to expand, to absorb gas molecules and to disperse the gas molecules within each tube. Amorphous nano-scale carbon tubes each comprising an aggregate of the hexagonal carbon layers are higher in gas-storing capability and durability than CNTs having a non-amorphous structure such as a graphitic structure.

(2) Amorphous nano-scale carbon tubes, if having open ends, require no complex process for opening the ends. Also, amorphous nano-scale carbon tubes having flat ends possess a relatively large structural strain at the ends, and are therefore easy to open at the ends.

(3) Further, amorphous nano-scale carbon tubes having a straight shape are advantageous in dense packing of the material and gas dispersion within the material.

(4) Furthermore, amorphous nano-scale carbon tubes having a flexible or elastic amorphous structure which can absorb external force, are useful from the standpoint of sliding property, abrasion resistivity and the like.

(4) When amorphous nano-scale carbon tubes are produced by placing a heat decomposable resin, which decomposes at a specific temperature, into an excited state in the presence of a catalyst comprising a metal powder and/or a metal salt, amorphous nano-scale carbon tubes with the above specific structure and shape can be produced in high purity, high yield and high mass-productivity.

(5) The amorphous nano-scale carbon tubes obtained by the above method are particularly suitable as a gas-storing material, a sliding material, an abrasion-resistant material or the like.

The present inventors conducted further research based on these findings, and consequently developed straight, stable and nano-oder nano-scale carbon tubes having an amorphous structure, and a method for producing the nano-scale carbon tubes in high purity, high yield and high mass-productivity.

The present invention provides the following amorphous nano-scale carbon tubes or carbon materials comprising the amorphous nano-scale carbon tubes, and methods for producing the same.

1. Nano-scale carbon tubes each containing a main framework which comprises carbon, and each having a diameter of 0.1 to 1000 nm and an amorphous structure.

2. The nano-scale carbon tubes according to item 1, each of which comprises hexagonal carbon layers each having a dimension in the planar direction that is smaller than the diameter of the carbon tube, as determined from a transmission electron microscope image.

3. The nano-scale carbon tubes according to item 1 or 2, each of which has an interlayer spacing (002) between hexagonal carbon layers of at least 3.54 Å, a diffraction angle ($2\theta$) of 25.1 degrees or less, and a $2\theta$ band half-width of at least 3.2 degrees, as determined with a diffractometer by an X-ray diffraction method (incident X-ray: CuK$\alpha$).

4. The amorphous nano-scale carbon tubes according to any one of items 1 to 3, each of which has a straight shape.

5. The amorphous nano-scale carbon tubes according to any one of items 1 to 4, each of which has a hollow cylindrical shape or a hollow rectangular prism shape.

6. The amorphous nano-scale carbon tubes according to any one of items 1 to 5, each of which has at least one open or flat end.

7. The amorphous nano-scale carbon tubes according to any one of the items 1 to 6, which are formed on a substrate, a particle or a porous material.

8. A gas-storing material comprising an amorphous carbonaceous material containing the amorphous nano-scale carbon tubes according to any one of items 1 to 7.

9. The gas-storing material according to item 8, which contains at least one of a metal salt and a metal.

10. The gas-storing material according to item 9, wherein the metal salt and the metal are selected from the group consisting of iron, cobalt, nickel, copper, platinum, palladium, rubidium, strontium, cesium, vanadium, manganese, aluminum, silver, lithium, potassium, sodium, magnesium, hydrogen-occluding alloys and metal complexes.

11. A method for storing a gas, wherein a gas is stored using the gas-storing material according to any one of items 8 to 10.

12. The method according to item 11, wherein the gas to be stored is hydrogen, methane, helium, neon, xenon, krypton or carbon dioxide.

13. A method for producing a carbon material containing the amorphous nano-scale carbon tubes according to any one of items 1 to 7, the method comprising subjecting a heat decomposable resin having a decomposition temperature of 200 to 900° C. to excitation treatment in the presence of a catalyst comprising a metal powder and/or a metal salt.

14. The method for producing said carbon material containing the amorphous nano-scale carbon tubes according to item 13, wherein the catalyst comprising a metal powder and/or a metal salt is at least one member selected from the group consisting of alkaline earth metals, iron, cobalt, nickel, chromium and their salts.

15. The method of producing said carbon material containing the amorphous nano-scale carbon tubes according to item 13 or 14, wherein the excitation treatment of the heat decomposable resin is carried out by heat treatment in an inert gas at a temperature of 300 to 3000° C.

16. The method for producing said carbon material containing the amorphous nano-scale carbon tubes according to item 13 or 14, wherein the excitation treatment of the heat decomposable resin is carried out by light irradiation treatment in an inert gas at a temperature of room temperature to 3000° C.

17. The method for producing said carbon material containing the amorphous nano-scale carbon tubes according to item 13 or 14, wherein the excitation treatment of the heat decomposable resin is carried out by plasma treatment in an inert gas at a temperature of room temperature to 3000° C.

18. The method for producing said carbon material containing the amorphous nano-scale carbon tubes according to item 13 or 14, wherein the excitation treatment of the heat decomposable resin is carried out by electron beam irradiation treatment in an inert gas at a temperature of room temperature to 3000° C.

19. The method for producing said carbon material containing the amorphous nano-scale carbon tubes according to item 13 or 14, wherein the excitation treatment of the heat decomposable resin is carried out by ion beam irradiation treatment in an inert gas at a temperature of room temperature to 3000° C.

BRIEF DESCRIPTION OF THE DRAWINGS

FIG. 3-A is a TEM photograph showing an amorphous nano-scale carbon tube obtained in Example 3.

FIG. 3-B is a TEM photograph showing a further enlarged image of the amorphous nano-scale carbon tube shown in FIG. 3-A.

FIG. 6-A is a TEM photograph showing an amorphous nano-scale carbon tube obtained in Example 18.

FIG. 6-B is a TEM photograph showing a further enlarged image of the amorphous nano-scale carbon tube shown in FIG. 6-A.

DETAILED DESCRIPTION OF THE INVENTION

According to the present invention, the heat decomposable resin for use as a starting material is not particularly limited, as far as it has a decomposition temperature of about 200 to 900° C. (preferably about 400 to 900° C.). Specific examples of such resins include polytetrafluoroethylene (PTFE), polyvinylidene chloride, polyvinylidene fluoride, polyethylene (PE), polyvinyl alcohol (PVA), polyimide, polyacrylonitrile and the like. Of the above heat decomposable resins, PTFE, PE, PVA, polyacrylonitrile and the like are preferred.

The heat decomposable resin as the starting material may be in any forms, such as film or sheet, powder, mass or the like. For example, the heat decomposable resin may be applied to or mounted on a substrate, and then subjected to excitation treatment under suitable conditions, whereby a carbon material comprising a thin layer of amorphous nanoscale carbon tubes formed on the substrate is obtained.

Catalysts usable for excitation treatment of the heat decomposable resin include, for example, iron, cobalt, nickel, chromium, magnesium and like metals; halides, complexes and like salts of these metals. Of the above catalysts, iron chloride is preferable. The particle size of the catalyst is not particularly limited, but is usually 5 mm or less, more preferably 100 µm or less.

Excitation of the starting heat decomposable resin is carried out with the catalyst in contact with the starting material (for example, with the catalyst particles applied to the surface of a film- or sheet-form starting material, or with a powdery starting material mixed with catalyst particles) in an inert atmosphere (in an atmosphere of inert gas such as Ar, He or $N_2$; at a pressure ranging from an elevated pressure to reduced pressure, preferably at a pressure not higher than 2 atms, more preferably at reduced pressure of about 400 torr or lower: under reduced pressure in the presence of an inert gas, and the like). The amount of the catalyst relative to the starting heat decomposable resin may greatly vary depending on the form and kind of the starting material, the kind and particle size of the catalyst, and the like. Usually, however, the catalyst is used in an amount of about 10 to 1/1000 times, preferably 1/10 to 1/50 times, the weight of the starting material.

The excitation of the starting material can be carried out by various means such as heat treatment, light irradiation treatment, plasma treatment or the like.

For excitation by heat treatment, the starting material is heated at a temperature which is not higher than 3000° C., preferably about 300 to 2000° C., more preferably about 450 to 1800° C., and which is not lower than the heat decomposition temperature of the starting material.

Excitation by light irradiation is carried out at a temperature which is within a range from room temperature to about 3000° C., and which is not lower than the heat decomposition temperature of the starting material. Usually a laser beam having a wavelength up to approximately 1200 nm, preferably a wavelength of about 150 to 1200 nm, is used for light irradiation treatment. Any types of laser beams conventionally used can be employed without limitation. Usable lasers include, for example, Nd:YAG laser, Ti:Sa laser, Dye laser, Dye+SHG laser, $Ar^+$ laser and $Kr^+$ laser.

Excitation by plazma treatment is carried out at a temperature which is within a range from room temperature to about 3000° C. and which is not lower than the heat decomposition temperature of the starting material. The process for plasma irradiation is not limited, and may comprise placing the starting material in an inert gas atmosphere or a reducing gas atmosphere, and contacting the starting material with a high-energy plasma stream to thereby obtain the desired product. In order to generate the plasma stream, an electromagnetic excitation source is used. The conditions for plasma generation can be suitably selected according to the kind of the gas, gas pressure, excitation voltage, excitation current, excitation power source frequency, electrode shape, etc.

Some gases are difficult to convert into a plasma state owing to their characteristics, but they can be converted into a plasma state by inputting an increased amount of excitation electromagnetic power. Examples of gases usable for plasma treatment in the invention include Ar, He, Kr, $N_2$ and like inert gases, hydrogen or like reducing gases, and mixtures of these gases. Among the above gases, Ar, He and the like are more preferred.

The gas pressure for the plasma treatment needs to be selected in relation to the input of the excitation electromagnetic power. With an increase in gas pressure, the number of gas molecules increases, and a large amount of energy is needed for excitation of individual gas molecules. Thus, a great amount of excitation electromagnetic power is necessary. For example, plasma generation is possible even at a gas pressure of 10 atms or more, but necessitates a large electric power source and therefore involves an extremely high facility cost. Also, a high excitation voltage and a high excitation current enable generation of a large amount of plasma particles, but an excessively high electric energy input or an excessively low pressure makes it difficult for the electromagnetic energy to smoothly transmit to the gas, and causes discharge between the electrodes, failing to generate a sufficient amount of plasma particles. On the other hand, when the gas pressure is low, a plasma is generated with a relatively low input of electromagnetic excitation power, but an excessively low pressure results in insufficient amount of plasma. In view of these factors, it is preferable that the gas pressure at the time of plasma generation is $10^{-2}$ torr to atmospheric pressure.

The electromagnetic power may be of a direct current or an alternating current, and the material and shape of the electrodes can be selected according to the form of the electromagnetic power to be input. As the alternating current, a low frequency current of about 50 to 60 Hz or about 1 to 10 kHz, or a high frequency current of about 10 MHz to several GHz is usually employed. As an industrial high frequency current, a current of 13.56 MHz, 40 MHz, 915 MHz or 2.45 GHz is generally employed. Materials usually used for the electrodes include stainless steel, aluminum and its alloys, common steel and the like. The shape of the electrodes is selected from capacitively coupled type, parallel plate type, hollow cathode type, coil type, etc.

A desired plasma can be generated easily at low cost, for example, by inputting a several hundred watts of electric power to coil type electrodes using a power source with a high frequency of 13.56 MHz, in an inert gas such as Ar, He, Kr or $N_2$, a reducing gas such as hydrogen, or a mixture of these gases, each having been adjusted to a reduced pressure of $1 \times 10^{-3}$ torr to several hundred torr.

When the starting material is subjected to electron beam irradiation, the irradiation is carried out under reduced pressure of usually about $10^{-2}$ to $10^{-7}$ torr (preferably about $10^{-3}$ to $10^{-5}$ torr) with an acceleration voltage of about 1 to 2000 kV (preferably about 50 to 1000 kV), while maintaining the starting material at a temperature of room temperature to 3000° C.

When the starting material is subjected to ion beam irradiation, the starting material is placed in a reduced pressure chamber (in which the pressure is reduced to usually about 100 to $10^{-7}$ torr, preferably about $10^{-1}$ to $10^{-5}$ torr), and irradiated with ionized He ions or Ar ions, with an acceleration voltage of about 100 V to 10 kV (preferably about 200 V to 1 kV) and an ion current of about 0.01 to 100 mA/cm$^2$ (preferably about 0.1 to 10 mA/cm$^2$).

Amorphous nano-scale carbon tubes or a carbon material containing amorphous nano-scale carbon tubes can also be synthesized by heat-treating a carbon material containing reactive —C≡C— and/or =C=. The heat treatment of the material is carried out in an inert atmosphere (in an inert gas such as Ar, He or N$_2$; at a pressure which is lower than atmospheric pressure, preferably under reduced pressure of about 400 torr or lower: under reduced pressure in the presence of an inert gas, or the like), at a temperature of 3000° C. or lower, preferably about 300 to 2000° C., more preferably 450 to 1800° C. The carbon material containing reactive —C≡C— and/or =C= is highly reactive owing to the triple bond in its molecule, and therefore can be easily made into amorphous nano-scale carbon tubes or a carbon material containing amorphous nano-scale carbon tubes.

The term "carbon material containing —C≡C— and/or =C=" as used herein encompasses a material comprising at least one of polyyne and cumulene, a material comprising at least one of —C≡C— and =C= bonds, a material partially comprising at least one or polyyne and cumulene, a material partially comprising at least one of —C≡C— and =C= bonds, and the like. The above term also encompasses a material comprising any of the above materials and a metal powder and/or a metal salt dispersed in the materials.

The "carbon material containing —C≡C— and/or =C=" for use in the present invention and the process for its synthesis are both known. For example, polyyne having reactive triple bonds is disclosed in Japanese Unexamined Patent Publications No. 1991-44852 and No. 1998-199726; M. Kijima et al, Synthetic Metals, 86(1997), 2279; and so on.

Further, a carbon material containing polyyne is disclosed in J. Kansther et al, Macromolecules, 28(1975); L. Kavan et al, Carbon, 32 (1994), 1533; and so on.

The above publications also described a carbon material containing —C≡C— and/or =C=.

The amorphous nano-scale carbon tubes according to the present invention are carbon nanotubes of nono-scale, having an amorphous structure, a hollow straight shape, and highly controlled pores. Each of the tubes usually has a shape of cylinder or rectangular prism, and most of the tubes have at least one uncapped (open) end. In the case where tubes with closed ends are present, most of these tubes have flat ends.

The amorphous nano-scale carbon tubes of the invention each has a diameter of usually about 0.1 to 1000 nm, preferably about 1 to 200 nm, more preferably about 1 to 100 nm. Each tube has a length twice as long as, more preferably 5 times as long as, its diameter.

"Amorphous structure" means a carbonaceous structure consisting of disordered hexagonal carbon layers, which is different from a graphitic structure consisting of continuous carbon layers of regularly disposed carbon atoms. In view of an image through a transmission electron microscope, which is typical analytical means, an amorphous nano-scale carbon tube according to the invention can be defined as a carbon tube in which the dimension in the planar direction of the hexagonal carbon layers is smaller than the diameter of the carbon tube.

Generally, amorphous carbon causes no X-ray diffraction but shows a broad reflection.

In a graphitic structure, hexagonal carbon layers are regularly stacked on one another, so that spacing between the hexagonal carbon layers ($d_{002}$) is narrow. Accordingly, the broad reflection shifts towards the high-angle side (2θ) and gradually narrows (has a smaller half-width of the 2θ band). As the result, the reflection can be observed as a $d_{002}$ diffraction band ($d_{002}$=3.354 Å when the layers are regularly stacked on one another with a graphitic configuration).

In contrast, an amorphous structure generally does not cause X-ray diffraction as described above, but partially shows very weak coherent scattering. As determined by an X-ray diffraction method (incident X-ray: CuKα) with a diffractometer, the theoretical crystallographic characteristics of the amorphous nano-scale carbon tubes of the invention are defined as follows: the spacing between hexagonal carbon layers ($d_{002}$) is at least 3.54 Å, preferably at least 3.7 Å; the diffraction angle (2θ) is 25.1 degrees or less, preferably 24.1 degrees or less; and the 2θ band half-width is at least 3.2 degrees, preferably at least 7.0 degrees.

It is preferable that nano-scale carbon tubes having such amorphous structure (amorphous carbon) account for more than 95%, preferably at least 99%, of the amorphous nano-scale carbon tubes of the invention as a whole.

The term "straight" which is one of the terms describing shape of the amorphous nano-scale carbon tubes of the invention, is defined as having the following property: When the length of an amorphous nano-scale carbon tube as determined from a TEM image is taken as L and the length of the carbon tube as stretched is taken as $L_O$, the value $L/L_0$ is at least 0.9.

It is preferable that such straight amorphous nano-scale carbon tubes account for at least 90%, preferably at least 95%, of the amorphous nano-scale carbon tubes of the invention as a whole.

It was initially reported that conventional CNTs were likely to store a gas such as hydrogen, but the gas-storing capacity has not been directly confirmed. Therefore, conventional CNTs are not applicable to practical use as a gas-storing material.

In contrast, the amorphous nano-scale carbon tubes of the invention have a straight shape and a highly controlled pore size. Further, the carbon tubes of the invention can disperse a gas also within the spacing between the hexagonal carbon layers, and thereby absorb the expansion caused by physisorption of the gas into the hollow portion, thus having a unique feature of possessing high durability. Therefore, the amorphous nano-scale carbon tubes of the invention are highly useful as a gas-storing material. Moreover, the pore size of the material of the invention can be controlled at a molecular level, so that the material can be used as a material for selectively adsorbing/storing a specific compound, or as a molecular sieve.

Furthermore, many of the amorphous nano-scale carbon tubes of the invention have at least one open end, obviating the complicating process for opening the ends. Further, most of the carbon tubes of the invention which have closed ends have flat ends and have a relatively high structural strain at the ends. The ends of carbon tubes with flat ends are also easy to open.

Moreover, since the amorphous nano-scale carbon tubes of the invention have a straight shape, they can be densely packed for gas storing and are advantageous for dispersion of a gas within the material.

Furthermore, the carbon tubes of the invention and a carbon material containing the carbon tubes have flexibility to absorb an external forth, and thus are useful as a sliding material, a wear resistive material or the like.

The amorphous nano-scale carbon tubes of the invention or the carbon material containing the carbon tubes are expected to have a high capacitance owing to their properties, when used as an anode for lithium secondary batteries.

The amorphous nano-scale carbon tubes of the invention or the carbon material containing the carbon tubes are also useful as a semiconductor material, semiconductor fibrils, an electron emitting material or the like.

EFFECTS OF THE INVENTION

The present invention accomplishes the following remarkable effects:

(a) Nano-scale carbon tubes being straight, stable and nano-order and having an amorphous structure can be obtained, which are useful as a novel gas-storing material having excellent durability and a high capacity to stably store a variety of gases.

(b) Amorphous nano-scale carbon tubes which were hitherto not known can be obtained through a synthesis mechanism different from known techniques by using, as a starting material, a heat decomposable resin or a carbon material containing reactive —C≡C— and/or =C=.

(c) Amorphous nano-scale carbon tubes with a reduced amount of impurity, or a carbon material containing the carbon tubes can be produced in a high yield. Therefore, desired nano-scale carbon tubes can be purified and obtained easily, realizing high mass-productivity on an industrial scale.

(d) The amorphous nano-scale carbon tubes have a hollow straight shape, and can be formed into a thin layer on a substrate. Accordingly, the carbon tubes are extremely useful as a material for electronic devices.

(e) The amorphous nano-scale carbon tubes or a carbon material containing the carbon tubes are useful as a gas-storing material, a high elasticity material, a high strength material, a wear resistive material, an electron beam emitter, a highly directional X-ray source, a soft X-ray source, a one-dimensional conductor, a high heat-conductive material, other materials for electronic devices, or the like.

PREFERRED MODE FOR CARRYING OUT THE INVENTION

The following Examples and Reference Examples are provided to illustrate the features of the present invention in further detail. However, the present invention is not limited to these Examples.

EXAMPLE 1

Figure 1:
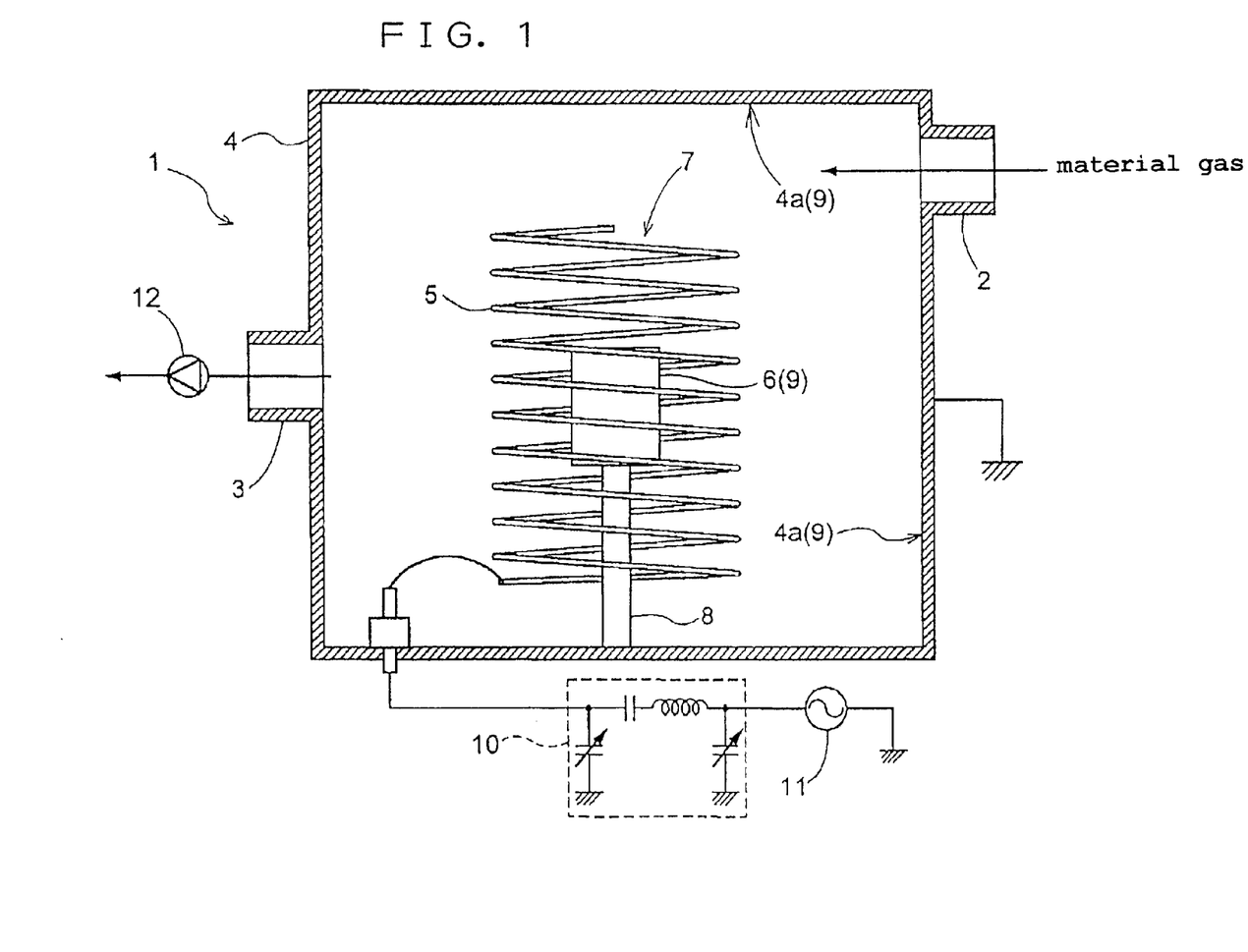
FIG. 1 is a schematic diagram showing a plasma excitation apparatus used in the working examples of the present invention.

10 mg of an anhydrous iron chloride powder (having a particle size not greater than 500 $\mu$m) was dusted uniformly over a PTEE film (60 $\mu$m×10 mm×10 mm), and the film was then excited by plasma. FIG. 1 shows the outline of a thin film forming apparatus 1 used. It is a matter of course that an apparatus having a structure other than that shown in FIG. 1 can be used in the present invention.

The thin film forming apparatus 1 shown in FIG. 1 comprises a reactor 4 equipped with a material gas inlet 2 and a gas discharge port 3, a first electrode 5 made of a helical wire and provided in the reactor 4 in an insulated manner, and further comprises a support member 8 electrically contacted with an object 6 and supporting the object 6 within a plasma generation area 7 surrounded by the first electrode 5; the support member 8, in combination with an internal wall 4a of the reactor 4, being electrically grounded to serve as a second electrode 2. Consequently, application of a high frequency current to the first electrode 5 induces a high frequency electric field in the plasma generation area 7, to thereby generate a so-called inductively coupled plasma.

The size of the helical first electrode 1 may be varied depending on the size of the object 6 held inside the helix. The helix has a diameter of about 1.5 to 10 times the overall dimension in the radial direction of the object 6, and has a height, in the axial direction perpendicular to the radial direction of the helix, of about 1.5 to 3 times the overall dimension in the axial direction of the object 6. Loops of the helical electrode 5, adjacent in the axial direction, are out of contact with one another and have intervals of preferably 1 to 10 mm.

In operation of the apparatus, a material gas supplied from the gas inlet 2 into the reactor 4 is introduced into the plasma generation area 7 through clearances between the loops of the first electrode 5. A predetermined high frequency current is passed through the first electrode 5 in the following manner: While one end of the first electrode 5 is open, a high frequency power source 11 with a maximum output of 10 kW is connected to the other end of the first electrode 5 via a matching circuit 10 provided outside the reactor 4, to apply a high frequency voltage of 13.56 MHz. A vacuum pump 12 is connected to the gas discharge port 3 to reduce the pressure in the reactor 4 to a predetermined reaction pressure.

Accordingly, when the high frequency voltage is applied to the first electrode 5 in the above manner, the first electrode 5 serves as a cathode electrode so as to generate another high frequency electric field (termed a capacitively coupled high frequency electric field) between the electrodes 5 and 9, in addition to the induction high frequency electric field. The inductively coupled plasma converts the material gas introduced into the plasma generation area 7, to high-energy active chemical species. The active chemical species, as charged particles, receive an electromagnetic force from the above two types of high frequency electric fields and from a high frequency magnetic field induced by the high frequency current, thereby exciting the object 6 with the resulting plasma.

The conditions for plasma excitation were as follows.

| Atmosphere | Ar |
|---|---|
| Internal Pressure | 0.01 torr |
| Electric power input | 300 W |
| RF frequency | 13.56 MHz |

After completion of the reaction, formation of amorphous nano-scale carbon tubes (diameter: 10 to 60 nm, length: 5 to 6 $\mu$m) was confirmed by SEM and X-ray diffraction.

Figure 2:
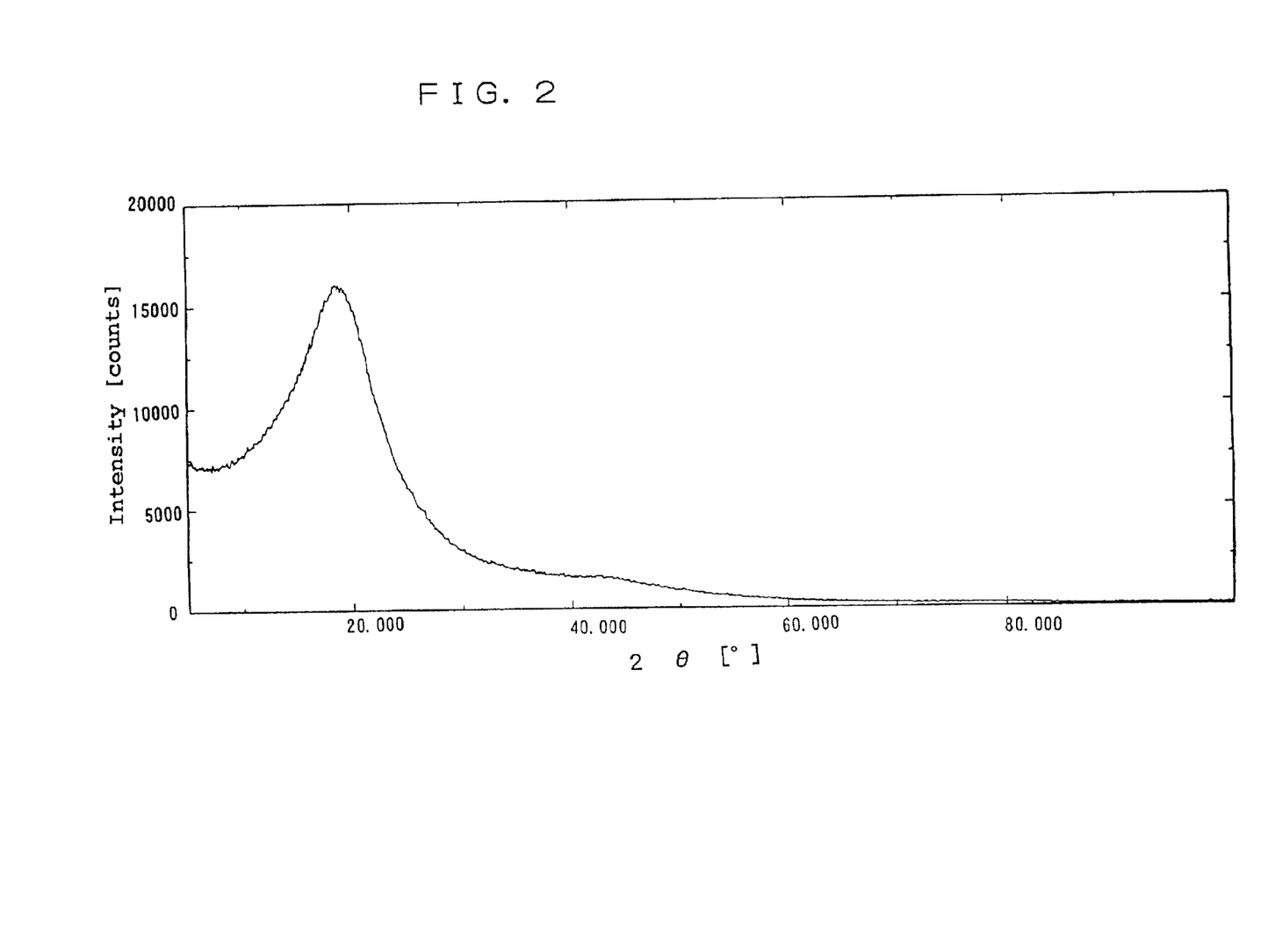
FIG. 2 is an X-ray diffraction chart of amorphous nano-scale carbon tubes obtained in Example 1.

FIG. 2 is an X-ray diffraction chart of the amorphous nano-scale carbon tubes obtained. FIG. 2 shows that the diffraction angle (2θ) was 19.1 degrees; that the spacing between the hexagonal carbon layers ($d_{002}$) calculated from the diffraction angle was 4.6 Å; and that the half-width of 2θ band was 8.1 degrees.

EXAMPLE 2

10 mg of an anhydrous iron chloride powder (having a particle size not greater than 500 $\mu$m) was dusted uniformly over a PTFE film (60 μm×10 mm×10 mm), and the film was placed in a vacuum furnace. The pressure in the furnace was reduced to 0.1 Pa, and then the film was irradiated with a laser beam.

The conditions for laser beam irradiation were as follows.

| | |
|---|---|
| Atmosphere | He |
| Internal pressure | 500 torr |
| Temperature | 800° C. |
| Input laser beam wavelength | 248 nm |
| Input laser beam power density | 17 mJ/pulse/cm$^2$ |
| Number of cycles of input laser beam | 1 Hz |
| Period of irradiation with the input laser beam | 30 minutes |

After completion of the reaction, formation of amorphous nano-scale carbon tubes was confirmed by SEM and X-ray diffraction. The product obtained in this Example had a diameter and length approximately equal to that of Example 2.

EXAMPLE 3

10 mg of an anhydrous iron chloride powder (having a particle size not greater than 500 μm) was dusted uniformly over a PTFE film (60 μm×10 mm×10 mm). The film was placed in a vacuum furnace. The furnace was purged with nitrogen 3 times, and the pressure in the furnace was reduced to 3 Pa. Then, the film was vacuum baked at 900° C. for 10 minutes.

Formation of amorphous nano-scale carbon tubes was observed by SEM and X-ray diffraction. The product obtained in this Example had a diameter and length approximately equal to that of Example 1.

Figure 3:
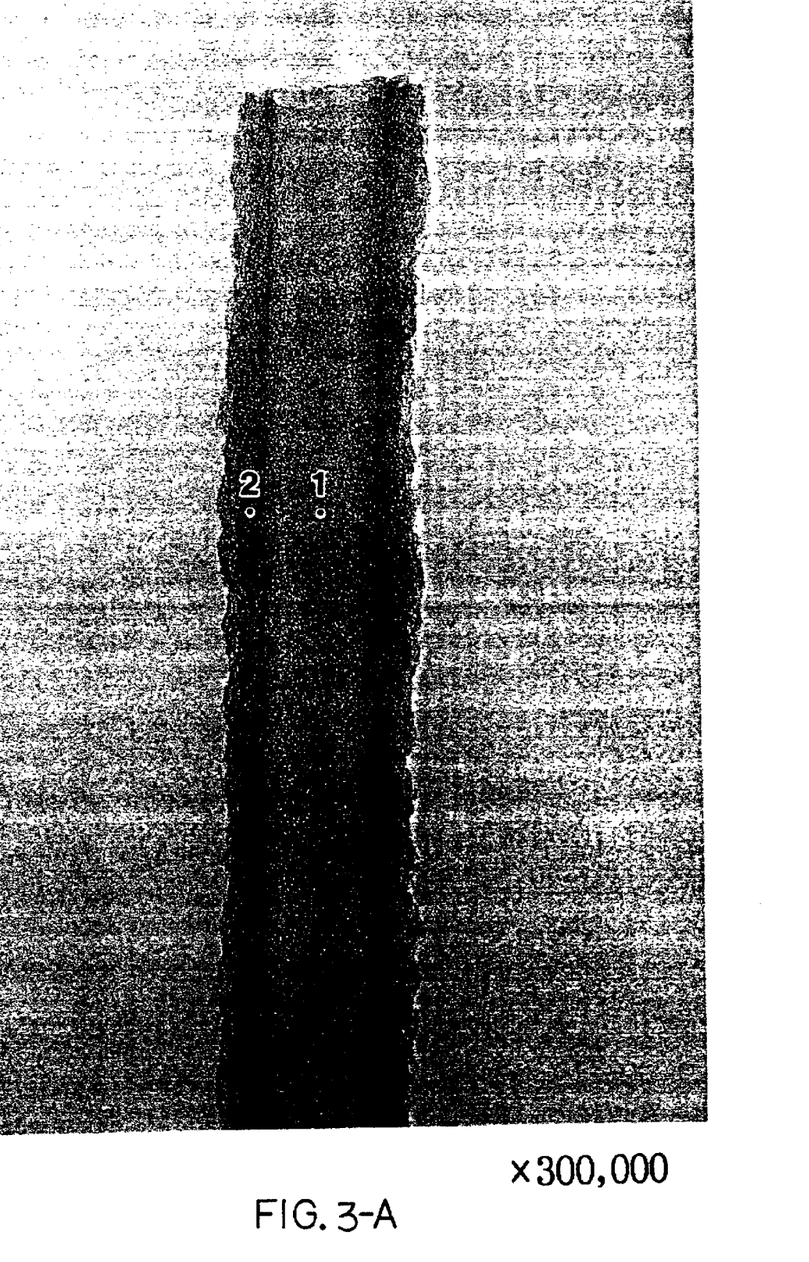
Figure 4:
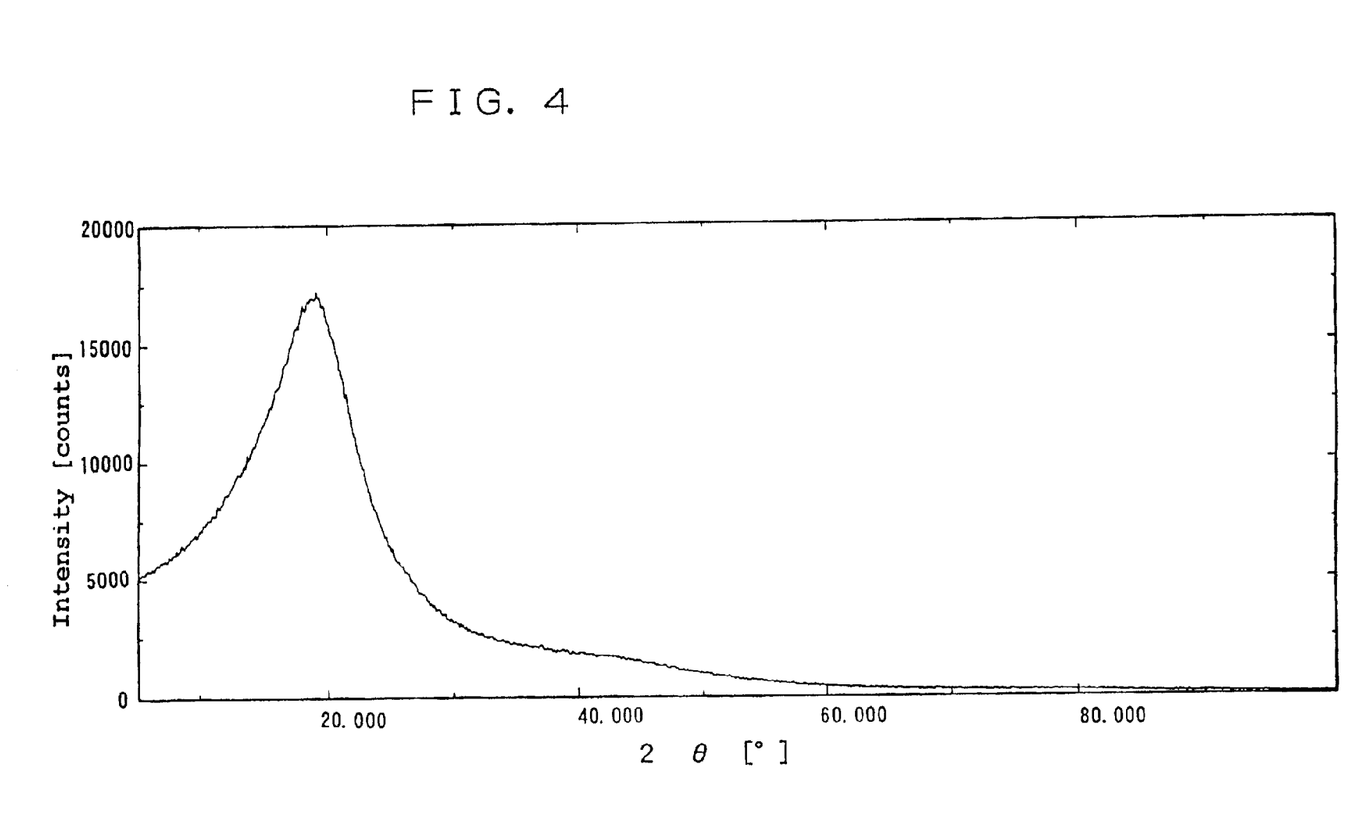
FIG. 4 is an X-ray diffraction chart of amorphous nano-scale carbon tubes obtained in Example 3.

FIG. 3-A and FIG. 3-B are TEM photographs of an amorphous nano-scale carbon tube obtained. FIG. 4 is an X-ray diffraction chart of the carbon tubes thus obtained.

TEM observation revealed that, in each of the obtained amorphous nano-scale carbon tubes, the dimension in the planar direction of the hexagonal carbon layers is smaller than the diameter of the carbon tube. The X-ray diffraction angle (2θ) was 18.9 degrees; the spacing between the hexagonal carbon layers ($d_{002}$) calculated from the diffraction angle was 4.7 Å; and the 2θ band half-width was 8.2 degrees.

EXAMPLES 4 TO 10

Amorphous nano-scale carbon tubes were formed in the same manner as in Example 3 except that the vacuum conditions, temperature and type of catalyst (only in Example 6) were changed as shown in Table 1. The product obtained in each of these Examples was approximately equal in diameter and length to that of Example 1.

TABLE 1

| | Catalyst | | Atmosphere | | |
|---|---|---|---|---|---|
| Example | Type | Amount (mg) | Type | Pressure (Pa) | Temperature (° C.) |
| 4 | FeCl$_2$ | 10 | Vacuum | 3 | 650 |
| 5 | FeCl$_2$ | 10 | He | 65800 | 800 |
| 6 | MgCl$_2$ | 10 | Vacuum | 3 | 800 |
| 7 | FeCl$_2$ | 10 | Ar | 750 | 700 |

TABLE 1-continued

| | Catalyst | | Atmosphere | | |
|---|---|---|---|---|---|
| Example | Type | Amount (mg) | Type | Pressure (Pa) | Temperature (° C.) |
| 8 | FeCl$_2$ | 10 | Nitrogen | 750 | 700 |
| 9 | FeCl$_2$ | 10 | Vacuum | 3 | 1500 |
| 10 | FeCl$_2$ | 10 | Nitrogen | $2 \times 10^5$ | 900 |

Figure 5:
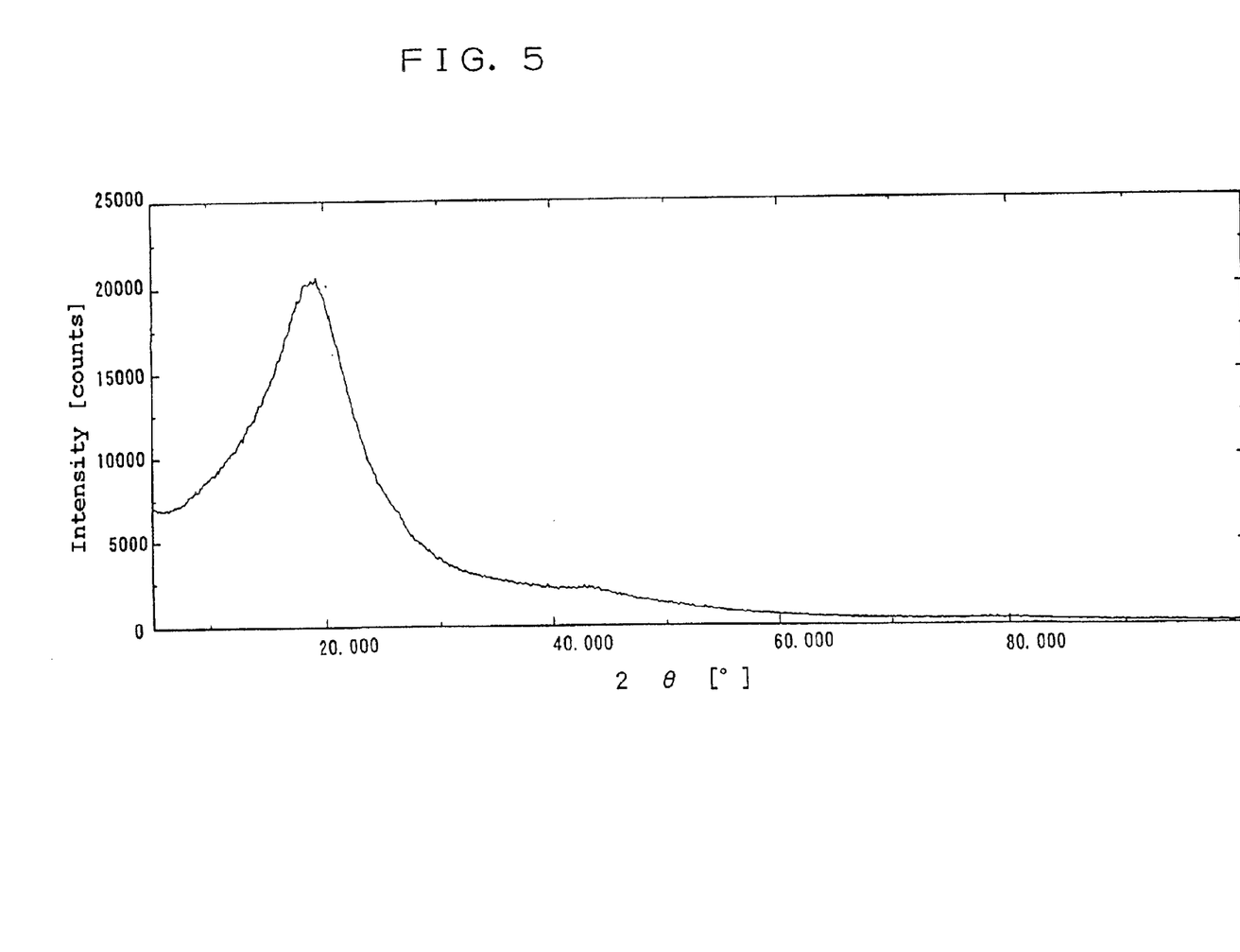
FIG. 5 is an X-ray diffraction chart of amorphous nano-scale carbon tubes obtained in Example 9.

FIG. 5 is an X-ray diffraction chart of the carbon tubes obtained in Example 9. In the product obtained by treatment at a relatively high temperature of 1500° C. in Example 9, the X-ray diffraction angle (2θ) was 19.1 degrees, the spacing between the hexagonal carbon layers ($d_{002}$) calculated from the X-ray diffraction angle was 4.6 Å, and the 2θ band half-width was 8.1 degrees.

EXAMPLE 11

0.6 g of an anhydrous magnesium chloride hexahydrate powder (having a particle size not greater than 500 μm) and 0.3 g of an anhydrous lithium chloride powder were dusted uniformly over 1 g of a PTFE film with a thickness of 60 μm. The film was placed in a vacuum furnace. The furnace was purged with nitrogen 3 times, and the pressure in the furnace was reduced to 0.1 Pa. Then, the film was vacuum heated at 900° C. for 30 minutes.

SEM and X-ray diffraction confirmed formation of amorphous nano-scale carbon tubes having a diameter of 10 to 60 nm and a length of 5 to 6 μm.

EXAMPLE 12

10 g of a polyvinyl alcohol powder and 10 mg of FeCl$_2$ were mixed together and placed in a vacuum furnace. The furnace was purged with nitrogen 3 times. The pressure in the furnace was reduced to 0.1 Pa, and then the mixture was vacuum heated at 900° C. for 30 minutes.

SEM and X-ray diffraction confirmed formation of amorphous nano-scale carbon tubes having a diameter of 10 to 60 nm and a length of 5 to 10 μm.

EXAMPLE 13

10 g of a polyethylene powder and 10 mg of FeCl$_2$ were mixed together and placed in a vacuum furnace. The furnace was purged with nitrogen 3 times. The pressure in the furnace was reduced to 0.1 Pa, and then the mixture was vacuum heated at 900° C. for 30 minutes.

SEM and X-ray diffraction confirmed formation of amorphous nano-scale carbon tubes having a diameter of 10 to 60 nm and a length of 5 to 10 μm.

EXAMPLE 14

10 g of a polyimide powder and 10 mg of FeCl$_2$ were mixed together and placed in a vacuum furnace. The furnace was purged with nitrogen 3 times. The pressure in the furnace was reduced to 0.1 Pa, and then the mixture was vacuum heated at 900° C. for 30 minutes.

SEM and X-ray diffraction confirmed formation of amorphous nano-scale carbon tubes having a diameter of 10 to 60 nm and a length of 5 to 10 μm.

EXAMPLE 15

10 g of a polyacrylonitrile powder and 10 mg of FeCl$_2$ were mixed together and placed in a vacuum furnace. The furnace was purged with nitrogen 3 times. The pressure in the furnace was reduced to 0.1 Pa, and then the mixture was vacuum heated at 900° C. for 30 minutes.

SEM and X-ray diffraction confirmed formation of amorphous nano-scale carbon tubes having a diameter of 10 to 60 nm and a length of 5 to 10 μm.

REFERENCE EXAMPLE 1

PTFE films were electrolytically or chemically reduced to synthesize carbon materials containing —C≡C— and/or =C= in their surface layers.

(1) Electrolytic reduction was performed by the two electrode method (anode: magnesium, cathode: stainless steel) using, as a solvent, a tetrahydrofuran solution of indicator salts (LiCl: 0.8 g, FeCl$_2$: 0.48 g, THF: 30 ml). 10 PTFE films (10 mm×10 mm×0.03 mm) and the solvent were placed in a flask equipped with an anode and a cathode, followed by electrolytic reduction with stirring in an argon atmosphere at 0° C. for 15 hours. During the reaction, a potential of 25 V was applied between the anode and the cathode. After completion of the reaction, the PTFE films were washed with THF, vacuum dried and stored in an argon atmosphere.

TEM observation of the cross sections of the films revealed that the surface portion of each film had been reduced and converted into a 10 μm-thick layer of a carbon material. Raman spectrum exhibited a band at 2100 cm$^{-1}$ attributable to C≡C, and a band at 1500 cm$^{-1}$ attributable to C=C. The above observation results demonstrate that, in the obtained material, the surface layers of the PTFE films had been converted into a carbon material containing —C≡C— and/or =C=.

(2) Chemical reduction was carried out as follows: 10.0 g of particulate Mg, 2.66 g of anhydrous lithium chloride (LiCl), 1.60 g of anhydrous ferrous chloride (FeCl$_2$), 20 PTFE films (8 mm×8 mm×50 μm, total weight: about 0.2 g) and a stirring bar were placed in an egg plant type flask (hereinafter referred to as "the reactor") with an internal volume of 100 ml equipped with a three-way cock. These raw materials were dried at 50° C. under a reduced pressure of 1 mmHg. Then, a dry argon gas was introduced into the reactor, and 44 ml of THF previously dried with sodium-benzophenone ketyn, followed by stirring at room temperature for about 3 hours using a magnetic stirrer.

After completion of stirring, the PTFE films, which had been converted to black-colored carbonaceous material, were recovered from the reaction mixture, washed twice with 20 ml of dry THF, and vacuum dried. TEM observation of the cross sections of the films revealed that a 10 μm-thick surface layer of each film had been reduced and converted into a carbon material. Analysis with a Raman spectrometer clearly showed a peak attributable to C=C (1500 cm$^{-1}$) and a peak attributable to C≡C (2100 cm$^{-1}$), which had not been observed in the original PTFE films.

The following Examples were carried out using samples synthesized by the above process (1) and those synthesized by the process (2), unless otherwise specified.

EXAMPLES 16 TO 20

The procedure of Reference Example 1 was followed to form a 10 μm-thick carbon material having —C≡C— and/or =C= structure of PTFE films. The carbon material was heat-treated under the conditions shown in Table 2.

TABLE 2

| Example | Atmosphere Type | Pressure (Pa) | Temperature (° C.) |
|---|---|---|---|
| 16 | Vacuum | 3.5 | 600 |
| 17 | Vacuum | 3.5 | 800 |
| 18 | Vacuum | 3.5 | 900 |
| 19 | Vacuum | 3.5 | 1100 |
| 20 | Vacuum | 3.5 | 1500 |

SEM and X-ray diffraction observation confirmed that a large amount of amorphous nano-scale carbon tubes (diameter: 10 to 60 nm, length: 5 to 6 μm) was formed at any of the above temperatures.

Figure 6:
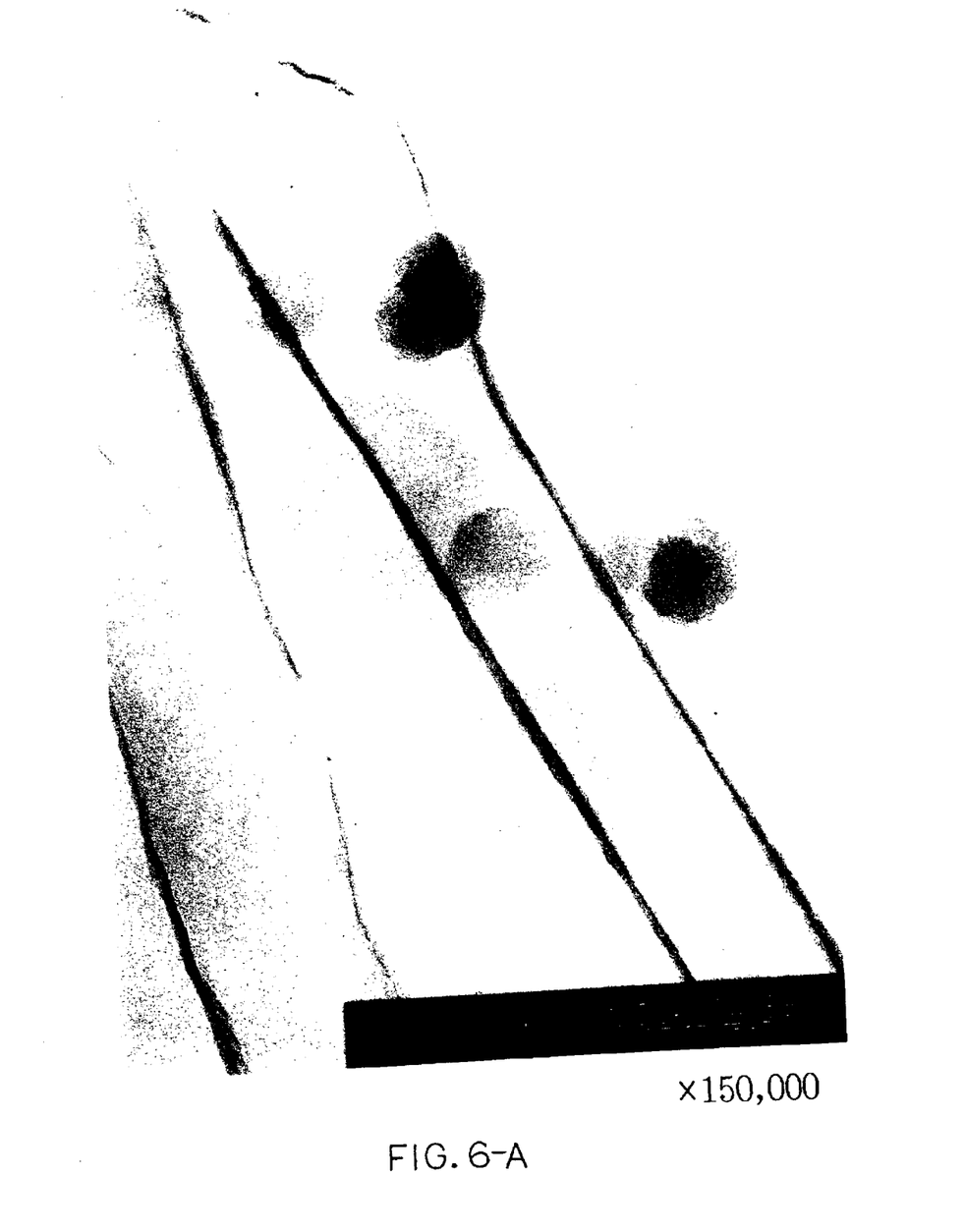

TEM photographs of the product obtained in Example 18 are shown in FIG. 6-A and in FIG. 6-B (an enlarged fragmentary view of the product shown in FIG. 6-A).

As to the carbon nanotubes of the above Examples, it was confirmed by TEM observation that the dimension in the planar direction of the hexagonal carbon layers is smaller than the diameter of the carbon nanotubes.

Table 3 presents X-ray diffraction data of typical samples. The X-ray diffraction angle (2θ) was in the range of 18.9 to 22.6 degrees; the spacing between the hexagonal carbon layers ($d_{002}$) was in the range of 3.9 to 4.7 Å; and the 2θ half-width of the was in the range of 7.6 to 8.2 degrees. Thus, the carbon material of the invention was confirmed to have an amorphous structure.

TABLE 3

| Example | Diffraction angle (2θ; degree) | $d_{002}$ diffraction band (Å) | 2θ band half-width (degree) |
|---|---|---|---|
| 1 | 19.1 | 4.6 | 8.1 |
| 3 | 18.9 | 4.7 | 8.2 |
| 5 | 18.9 | 4.7 | 8.2 |
| 6 | 18.9 | 4.7 | 8.2 |
| 9 | 19.1 | 4.6 | 8.1 |
| 18 | 20.0 | 4.4 | 8.0 |
| 20 | 22.6 | 3.9 | 7.6 |

SEM and TEM observation revealed that the amorphous nano-scale carbon tubes obtained in the Examples had a straight shape, and were not entangled with one another.

COMPARATIVE EXAMPLE 1

Carbon nanotubes were synthesized by a conventional arc discharge method, purified, and observed with SEM, TEM and X-ray diffraction.

SEM and TEM observation showed that the carbon nanotubes obtained in Comparative Example 1 had a graphitic structure, had a curvilinear shape, and were entangled with one another. The X-ray diffraction angle (2θ) was 26.2 degrees, the spacing between the hexagonal carbon layers ($d_{002}$) was 3.40 Å, and the 2θ band half-width was 0.9 degree. These results also confirmed that the carbon nanotubes had a graphitic structure.

The amorphous nano-scale carbon tubes obtained in the Examples 1 were tested for repetitive hydrogen-storing properties at 100 atms by a gravimetric method (with buoyancy correction) using a two-component adsorption measurement apparatus ("FMS-BI-H" manufactured by BEL JAPAN, INC.).

Table 4 shows the hydrogen-storing properties of typical samples. After a hydrogen-releasing step, the amount of adsorbed hydrogen in each material became substantially zero. It was confirmed by the results shown in Table 4 that the amorphous nano-scale carbon tubes of the invention have a high capacity for storing hydrogen, and high durability.

TABLE 4

| | Amount of hydrogen stored (wt. %) | | | | | |
|---|---|---|---|---|---|---|
| | 1st trial | 3rd trial | 5th trial | 10th trial | 20th trial | 30th trial |
| Example 3 | 1.6 | 1.6 | 1.6 | 1.6 | 1.6 | 1.6 |
| Example 9 | 2.3 | 2.3 | 2.3 | 2.3 | 2.3 | 2.3 |
| Comp. Ex. 1 | 0.2 | 0.2 | 0.2 | 0.1 | 0.0 | 0.0 |

It was also confirmed that the carbon materials obtained in the Examples have a high capacity for storing other gases (such as methane, helium, neon, xenon, krypton and carbon dioxide), which is equivalent to their hydrogen-storing capacity.

What is claimed is:

1. Amorphous nano-scale carbon tubes each containing a main framework which comprises carbon, and each having a straight shape, a diameter of 0.1 to 1000 nm and an amorphous structure, and each having an interlayer spacing (002) between hexagonal carbon layers of at least 3.7 Å, a diffraction angle (2θ) of 24.1 degrees or less, and a 2θ degrees or less, and a 2θ band half-width of at least 3.2 degrees, as determined with a diffractometer by an X-ray diffraction method (incident X-Ray: CuKα).

2. Amorphous nano-scale carbon tubes according to claim 1, each of which comprises hexagonal carbon layers each having a dimension of the planar direction that is smaller than the diameter of the carbon tube, as determined from a transmission electron microscope image.

3. Amorphous nano-scale carbon tubes according to claim 1, each of which has a 2θ band half-width of at least 7.0 degrees, as determined with a diffractomer by an X-ray diffraction method (incident X-ray: CuKα).

4. The amorphous nano-scale carbon tubes according to claim 1, each of which has an interlayer spacing (002) between hexagonal carbon layers of 3.9 to 4.7 Å, a diffraction angle (2θ) of 18.9 to 22.6 degrees, and a 2θ band half-width of 7.6 to 8.2 degrees, as determined with a diffractometer by an X-ray diffraction method (incident X-ray: CuKα).

5. Amorphous nano-scale carbon tubes according to claim 1, each of which has a hollow cylindrical shape or a hollow rectangular prism shape.

6. Amorphous nano-scale carbon tubes according to claim 1, each of which has at least one open end.

7. Amorphous nano-scale carbon tubes according to claim 1, which are formed on a substrate, a particle or a porous material.

8. A gas-storing material comprising an amorphous carbonaceous material containing the amorphous nano-scale carbon tubes according to claim 1.

9. The gas-storing material according to claim 8, which contains at least one of a metal salt and a metal.

10. The gas-storing material according to claim 9, wherein the metal salt and the metal are selected from the group consisting of iron, cobalt, nickel, copper, platinum, palladium, rubidium, strontium, cesium, vanadium, manganese, aluminum, silver, lithium, potassium, sodium, magnesium, hydrogen-occluding alloys and metal complexes.

11. A method for storing a gas, wherein a gas is stored using the gas-storing material according to any one of claims 8 to 10.

12. The method according to claim 11, wherein the gas to be stored is hydrogen, methane, helium, neon, xenon, krypton or carbon dioxide.

13. A method for producing a carbon material containing amorphous nano-scale carbon tubes according to claim 1, the method comprising subjecting a heat decomposable resin having a decomposition temperature of 200 to 900° C. to excitation treatment in the presence of a catalyst, the heat decomposable resin being selected from the group consisting of polytetrafluoroethylene, polyvinylidene chloride, polyvinylidene fluoride and polyvinyl alcohol, and the catalyst being at least one halide of a metal selected from the group consisting of magnesium, iron, cobalt and nickel.

14. The method according to claim 13, wherein the catalyst is iron chloride.

15. The method for producing said carbon material containing the amorphous nano-scale carbon tubes according to claim 13 or 14, wherein the excitation treatment of the heat decomposable resin is carried out by a heat treatment in an inert gas at a temperature of 300 to 3000° C.

16. The method for producing said carbon material containing the amorphous nano-scale carbon tubes according to claim 13 or 14, wherein the excitation treatment of the heat decomposable resin is carried out by a light irradiation treatment in an inert gas at a temperature of room temperature to 3000° c.

17. The method for producing said carbon material containing the amorphous nano-scale carbon tubes according to claim 13 or 14, wherein the excitation treatment of the heat decomposable resin is carried out by plasma treatment in an inert gas at a temperature of room temperature to 3000° C.

18. The method for producing said carbon material containing the amorphous nano-scale carbon tubes according to claim 13 or 14, wherein the excitation treatment of the heat decomposable resin is carried out by electron beam irradiation treatment in an inert gas at a temperature of room temperature to 3000° C.

19. The method for producing said carbon material containing the amorphous nano-scale carbon tubes according to claim 13 or 14, wherein the excitation treatment of the heat decomposable resin is carried out by ion beam irradiation treatment in an inert gas at a temperature of room temperature to 3000° C.

20. A carbon material containing the amorphous nano-scale carbon tubes according to claim 1.

* * * * *